United States Patent [19]
Veser

[11] Patent Number: 6,007,304
[45] Date of Patent: Dec. 28, 1999

[54] VACUUM BLOWER/DEVICE HAVING A SECOND GRIP AND A SUPPORT AT A LOWER AREA OF THE HOUSING

[75] Inventor: Norbert Veser, Weinstadt, Germany

[73] Assignee: Andreas Stihl AG & Co., Germany

[21] Appl. No.: 09/007,439

[22] Filed: Jan. 15, 1998

[30] Foreign Application Priority Data

Jan. 15, 1997 [DE] Germany ............... 297 00 587 U

[51] Int. Cl.⁶ ................ F04B 35/00; F04B 35/06
[52] U.S. Cl. .................................. 417/234; 417/364
[58] Field of Search ............................ 417/234, 364

[56] References Cited

U.S. PATENT DOCUMENTS

| | | | |
|---|---|---|---|
| 4,631,006 | 12/1986 | Murray | 417/234 |
| 4,792,286 | 12/1988 | Gassen | 417/234 |
| 5,403,152 | 4/1995 | Trautloff et al. | 417/234 |
| 5,421,520 | 6/1995 | Simonette et al. | 417/234 |

FOREIGN PATENT DOCUMENTS 3125889   1/1983   Germany ................. 417/234

Primary Examiner—Charles G. Freay
Assistant Examiner—Cheryl J. Tyler
Attorney, Agent, or Firm—Robert W. Becker & Associates

[57] ABSTRACT

A hand-held vacuum/blower device has a housing and a motor arranged in the housing. The housing includes a blower spiral. A blower wheel is arranged in the blower spiral. The housing has a top side and a bottom side. A first grip is connected to the top side, and a second grip is connected to the bottom side. A support element is provided at the bottom side and has a first support surface for supporting the vacuum/blower device in a rest position. The second grip has a second support surface extending at least over a portion of its length at the same level as the first support surface.

10 Claims, 3 Drawing Sheets

VACUUM BLOWER/DEVICE HAVING A SECOND GRIP AND A SUPPORT AT A LOWER AREA OF THE HOUSING

BACKGROUND OF THE INVENTION

The present invention relates to a hand-held vacuum/blower device having a housing in which a drive motor is arranged and having a blower spiral formed at the housing with a blower wheel arranged therein. The top side of the housing is provided with a first grip, and the lower area of the housing has a second grip as well as a support for resting the housing on a surface.

From German Patent Application 31 25 889 A1 a hand-held blower device is known that is comprised of a housing having at the top side a grip and a blower wheel arranged within the housing. The blower is driven by a combustion engine provided within the housing. The blower wheel is positioned in the lower area of the housing and the combustion engine with its auxiliary devices is arranged above the blower wheel. At an air outlet channel a support surface for the blower housing is provided, and at the other end of the housing part a support is fastened. In this manner, the blower device can be placed onto a surface even when the drive motor is still running without impeding the function of the blower.

From U.S. Pat. No. 4,792,286 a blower device with an internal combustion engine arranged in a housing for driving a blower wheel is known. The device comprises an upper grip and a lateral grip at the lower portion of the housing. A housing wall at the underside of the housing is formed to provide a support with which the blower device can be rested on the ground.

It is an object of the present invention to provide a vacuum/blower device of the aforementioned kind that is embodied so as to save material and weight and which can be held and manipulated in a simple manner.

SUMMARY OF THE INVENTION

The hand-held vacuum/blower device according to the present invention is primarily characterized by:

A housing;

A motor arranged in the housing;

The housing comprising a blower spiral;

A blower wheel arranged in the blower spiral;

The housing having a top side and a bottom side;

A first grip connected to the top side;

A second grip connected to the bottom side;

A support element provided at the bottom side and having a first support surface for supporting the vacuum/blower device in a rest position thereof;

The second grip having a second support surface extending at least over a portion of the length of the second grip at a same level as the first support surface.

The second support surface is a flat exterior surface of the second grip.

The second grip extends at least partly parallel to the support.

The second grip is a unitary part of the housing.

The second grip is preferably a profiled member consisting of plastic.

The support element is preferably a part of the blower spiral and the second support surface is a surface of the blower spiral.

The support element is arranged at a projecting wall of the housing.

The housing is preferably comprised of a housing member and a cover attached to one another at a first partition plane.

The blower spiral is comprised of a portion that is a unitary part of the cover and a lid attached to one another at a second partition plane.

The decisive advantage of the present invention is that the vacuum/blower device has a respective grip for guiding the device during vacuum operation or during blowing operation so that a conversion or modification of the device is not necessary. Furthermore, the required material expenditure for ensuring safe and stable placement of the device is minimal because one of the grips is simultaneously a further support element so that the actual support element must have only a small support surface. By spacing the two support elements relative to one another, the stability of the device when in its rest position is further increased.

The support function can also be provided by a second grip with round cross-section. However, it is advantageous to provide a larger support surface area at this grip or second support element whereby it is expedient to provide the grip with a flattened exterior surface. Since the second grip is designed with respect to ergonomic considerations, it is provided with a curvature so that it is not positioned over its entire length in one plane. For its function as an additional support element it is however sufficient that the second grip extends at least partly parallel to the support element provided at the housing. For reducing the manufacturing and mounting expenditures, it is advantageous to provide the second grip as a unitary part of the housing. In order to achieve a high stability with minimal material expenditure for the grip, it is expedient to provide the second grip as a profiled member or bracket, preferably consisting of plastic. The support element provided at the housing is preferably provided at a surface of the blower spiral so that for this support no additional material is required but instead the exterior wall of the blower spiral can be used as a support surface of the device. Depending on the embodiment of the vacuum/blower device the support element at the housing can also be provided at a projecting or elongate housing wall of the housing.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 3.

Figure 1:
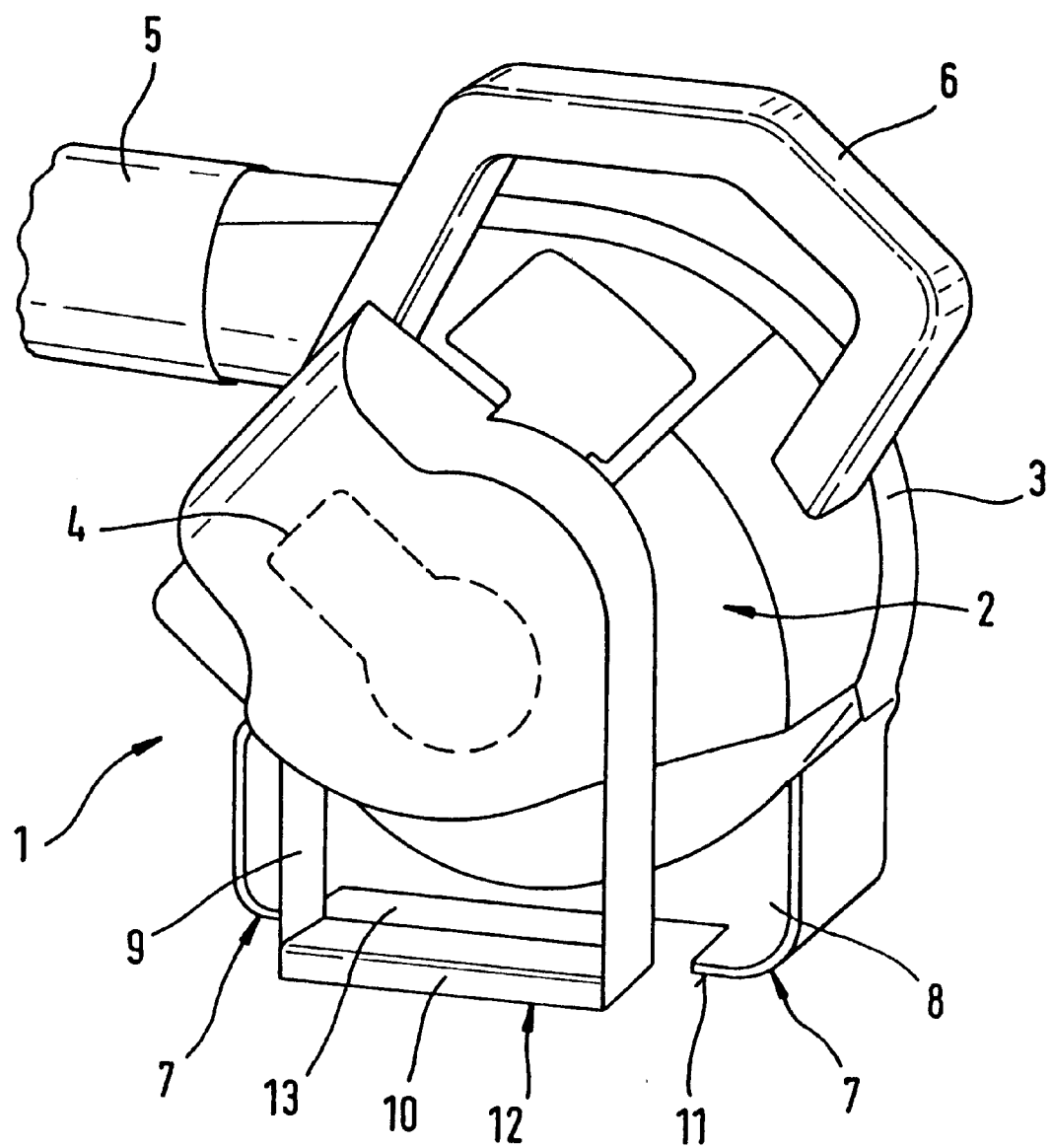
FIG. 1 is a perspective view of a vacuum/blower device.

FIG. 1 shows a vacuum/blower device 1 having a housing 2 with a drive motor 4 arranged therein. The housing 2 comprises a blower spiral 3 having arranged at one end a blower tube 5. The device 1 comprises at the top side of the housing 2 a first grip 6 for holding and handling the device in a first operational position. At the bottom side of the housing 2 a housing wall 8 extends in the downward direction and has provided at its end a support element 7. The underside of the support element 7 serves as a support surface 11 of the device 1. A further support 12 is provided by the second grip 10 which is connected by lateral stays 9 to the housing 2. This second grip 10 serves for holding and handling the device 1 in a second operational position. Between the support element 7 at the housing and the second support element 12 a spacing 13 is provided so that the second grip 10 can be easily accessed. The support surface 11 and the underside of the second grip 10 are positioned in a common plane so that the device 1 in its rest position is provided with great stability, i.e., will not tip over easily even when the drive motor 4 is running.

Figure 2:
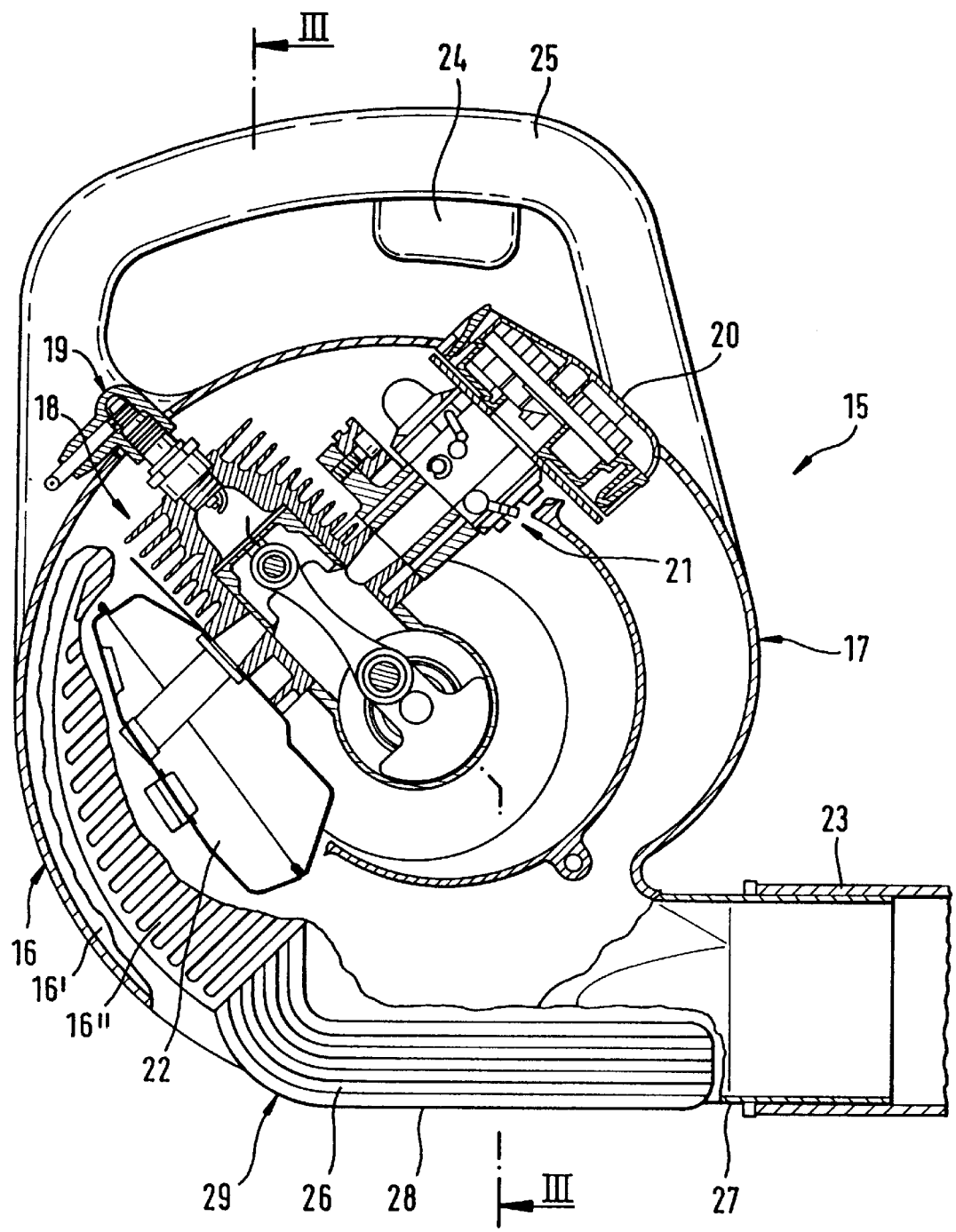
FIG. 2 is a side view of a second embodiment of a vacuum/blower device.

FIG. 2 shows a further embodiment of a vacuum/blower device 15 whereby this representation shows the housing 16 partly in section in order to illustrate the arrangement of the drive motor 18. The drive motor 18 is provided with a spark plug 19. It comprises at the vacuum side an air filter 20 as well as a carburetor 21 and at the exhaust side an exhaust muffler 22. The housing 16 is comprised of a housing member 16' and a cover 16". To the end of the blower spiral 17, whose design will be explained in more detail with the aid of FIG. 3, a blower tube 23 is connected. In this embodiment of the vacuum/blower device 15 the blower tube 23 is thus adjacent to the support surface 27, i.e., the blower spiral 17 provides with its portion extending to the blower tube 23 the support element at the housing. At the top side of the housing 16 the first grip 25 is arranged which supports the throttle lever 24. At the lower area or bottom side of the housing 16 a second grip 26 is arranged which is preferably a unitary part of the housing. The second grip 26 extends over a portion of its longitudinal extension parallel to the support element at the housing, respectively, its support surface 27 so that the second grip 26 at its underside provides a support surface 28 which forms thus a further support element 29.

Figure 3:
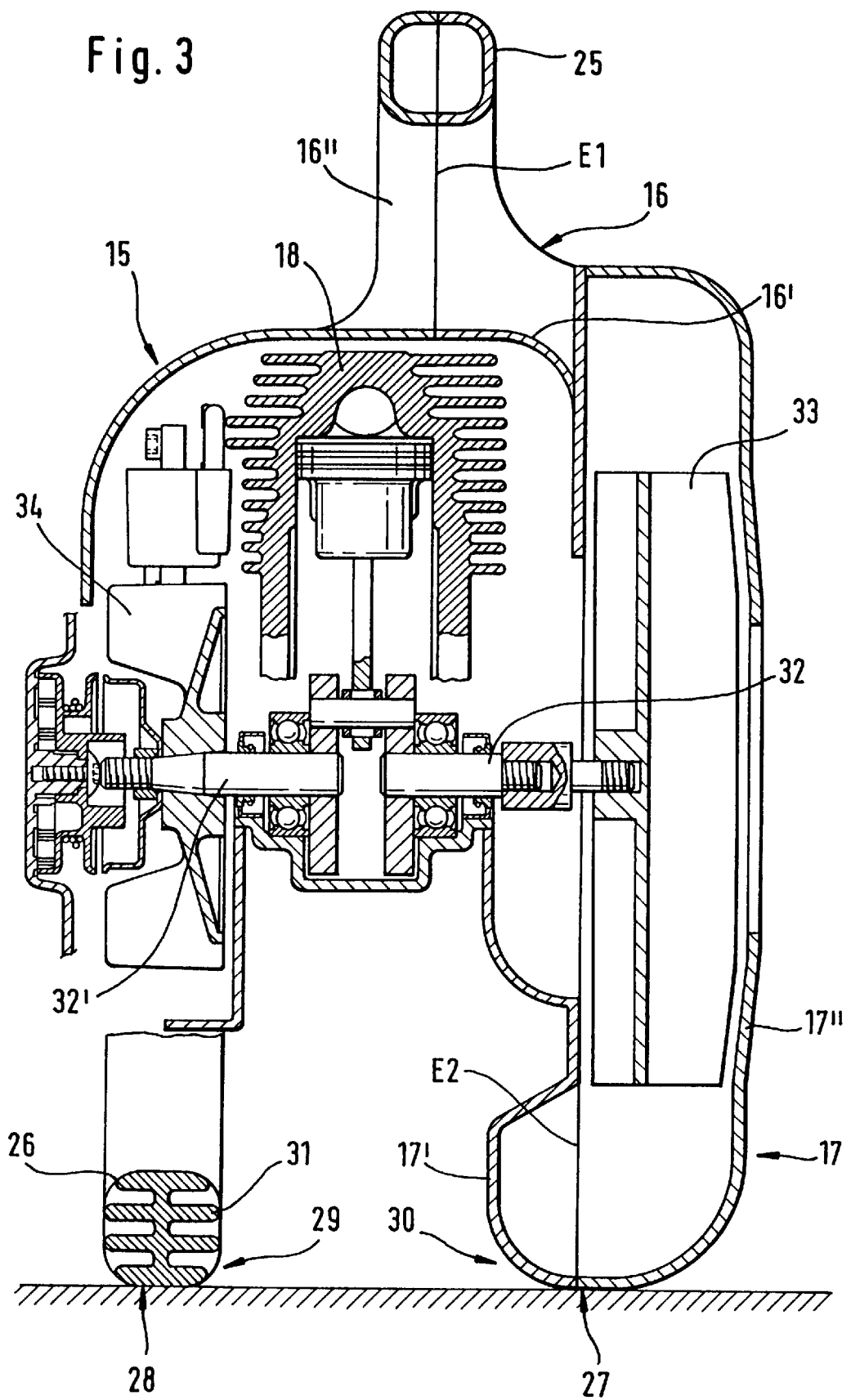
FIG. 3 is a section along the line III—III of FIG. 2.

FIG. 3 shows a section along the line III—III of FIG. 2. This representation shows the drive motor 18 arranged in the housing 16 in section along the crankshaft 32, 32'. One end of the crankshaft 32' has positioned thereat the blower wheel 34 for conveying a cooling air stream to the drive motor 18. At the other end of the crankshaft 32 a blower wheel 33 is fastened that rotates within the blower spiral 17 and produces an air stream. The housing 16 is comprised of a housing member 16' and a cover 16" resting at one another along the partition plane E1. At the upper area of the housing member 16' and the cover 16" the first grip 25 is formed. The grip 25 is preferably hollow and substantially shaped so as to have a square cross-section with rounded corners. The blower spiral 17 is preferably comprised of a portion 17' that is preferably a unitary part of the housing member 16' and a lid 17" which are connected or attached to one another along the partition plane E2. The underside of the blower spiral 17 is flattened and thus forms the support surface 27 of the support element 30 at the housing. The second support element 29, i.e., the second grip 26, has a support surface 28 at its underside. The second grip 26, embodied as a second support element 29, also provides a large support surface area. The second grip 26 is expediently a profiled member or bracket 31 so that for a reduced material expenditure a sufficient stability of the second grip 26 is provided.

The specification incorporates by reference the disclosure of German priority document 297 00 587.1 of Jan. 15, 1997.

The present invention is, of course, in no way restricted to the specific disclosure of the specification and drawings, but also encompasses any modifications within the scope of the appended claims.

What is claimed is:

1. A hand-held vacuum/blower device comprising:

a housing;

a motor arranged in said housing;

said housing comprising a blower spiral;

a blower wheel arranged in said blower spiral;

said housing having a top side and a bottom side;

a first grip connected to said top side;

a second grip connected to said bottom side;

a support element provided at said bottom side and having a first support surface for supporting said vacuum/blower device in a rest position thereof;

said second grip having a second support surface extending at least over a portion of a length of said second grip at a same level as said first support surface.

2. A vacuum/blower device according to claim 1, wherein said second support surface is a flat exterior surface of said second grip.

3. A vacuum/blower device according to claim 1, wherein said second grip extends at least partly parallel to said support element.

4. A vacuum/blower device according to claim 1, wherein said second grip is a unitary part of said housing.

5. A vacuum/blower device according to claim 1, wherein said second grip is a profiled member.

6. A vacuum/blower device according to claim 5, wherein said second grip consists of plastic.

7. A vacuum/blower device according to claim 1, wherein said support element is a part of said blower spiral and wherein said first support surface is a surface of said blower spiral.

8. A vacuum/blower device according to claim 1, wherein said support element is arranged at a projecting wall of said housing.

9. A vacuum/blower device according to claim 1, wherein said housing is comprised of a housing member and a cover attached to one another at a first partition plane.

10. A vacuum/blower device according to claim 9, wherein said blower spiral is comprised of a portion that is a unitary part of said cover and a lid attached to one another at a second partition plane.

\* \* \* \* \*